United States Patent
Berger et al.

(10) Patent No.: US 9,393,841 B2
(45) Date of Patent: Jul. 19, 2016

(54) TYRE TREAD HAVING CAVITIES AND INCISIONS

(75) Inventors: Eric Berger, Loubeyrat (FR); Cyril Guichon, Beauregard-Vendon (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 891 days.

(21) Appl. No.: 13/516,599

(22) PCT Filed: Dec. 17, 2010

(86) PCT No.: PCT/EP2010/070037
§ 371 (c)(1),
(2), (4) Date: Aug. 14, 2012

(87) PCT Pub. No.: WO2011/076676
PCT Pub. Date: Jun. 30, 2011

(65) Prior Publication Data
US 2012/0298270 A1    Nov. 29, 2012

(30) Foreign Application Priority Data

Dec. 22, 2009 (FR) .................................. 09 59339

(51) Int. Cl.
*B60C 11/12* (2006.01)
*B60C 11/03* (2006.01)

(52) U.S. Cl.
CPC ............. *B60C 11/12* (2013.01); *B60C 11/0323* (2013.04); *B60C 11/1281* (2013.04)

(58) Field of Classification Search
CPC   B60C 11/0323; B60C 11/12; B60C 11/1281; B60C 11/1218; B60C 11/1209; B60C 11/032; B60C 11/0306; B60C 11/0309; B60C 11/11
USPC ...................... 152/209.18, 209.6, 209.17, 902
See application file for complete search history.

(56) References Cited

U.S. PATENT DOCUMENTS 2,121,955 A * 6/1938 Eger .................. B60C 11/0306
152/209.18
2,621,698 A * 12/1952 Zohrer .................... B60C 11/01
152/209.14

(Continued)

FOREIGN PATENT DOCUMENTS

| EP | 1 938 939 A1 | 7/2008 |
| JP | 2-310108 A | 12/1990 |

(Continued)

OTHER PUBLICATIONS

JP 2003-191714, Jul. 2003, English language machine translation, National Center for Industrial Property Information and Training [https://www4.j-platpat.inpit.go.jp/eng/tokujitsu/tkbs_en/TKBS_EN_GM101_Top.action].*

(Continued)

*Primary Examiner* — Eric Hug
(74) *Attorney, Agent, or Firm* — Dickinson Wright PLLC

(57) ABSTRACT

A tire tread having a plurality of ribs delimited by cut-outs, each having a generally parallelepipedal shape and having a length (L) and a width (W), the width (W) being determined between a first lateral face and a second lateral face of the rib, the width (W) being less than the length (L), at least one rib having at least one cavity placed inside the rib, the cavity extending mainly in the length (L) of the rib. The tread having an incision extending mainly in the length (L) of the rib, the incision emerging on the first lateral face of the rib and the incision emerging in the cavity while forming an opening, the length (Lo) of the opening determined in the length (L) of the rib corresponding at least to 80% of the length (Lc) of the cavity determined in the length (L) of the rib.

12 Claims, 4 Drawing Sheets

(56) References Cited

U.S. PATENT DOCUMENTS

| | | | | |
|---|---|---|---|---|
| 4,995,437 | A | * | 2/1991 | Enoki .................. B60C 11/1346 152/209.16 |
| 5,522,442 | A | * | 6/1996 | Kishi ...................... B60C 11/01 152/209.16 |
| 7,306,019 | B2 | * | 12/2007 | Kurokawa .............. B29D 30/52 152/209.17 |
| 8,985,168 | B2 | * | 3/2015 | Kurokawa ........... B60C 11/1281 152/209.18 |
| 2002/0100527 | A1 | | 8/2002 | Radulescu |
| 2006/0090826 | A1 | | 5/2006 | Merino Lopez |
| 2006/0090827 | A1 | | 5/2006 | Merino Lopez |
| 2008/0152743 | A1 | | 6/2008 | Nguyen et al. |
| 2009/0178743 | A1 | * | 7/2009 | Nagai .................... B60C 11/11 152/209.1 |
| 2011/0284141 | A1 | * | 11/2011 | Mathews ............ B60C 11/1222 152/209.18 |

FOREIGN PATENT DOCUMENTS

| | | | |
|---|---|---|---|
| JP | 200211322 | | 8/2000 |
| JP | 2001-063323 A | | 3/2001 |
| JP | 2002225509 | | 8/2002 |
| JP | 2003-191714 | * | 7/2003 |
| JP | 2006-051863 | * | 2/2006 |
| JP | 2006-076323 | * | 3/2006 |
| JP | 2009-214824 | * | 9/2009 |
| JP | 2009292229 | | 12/2009 |
| JP | 2010-280355 | * | 12/2010 |
| WO | WO 2010/030276 A1 | | 3/2010 |

OTHER PUBLICATIONS

JP 2009-214824, Sep. 2009, English language machine translation, National Center for Industrial Property Information and Training [https://www4.j-platpat.inpit.go.jp/eng/tokujitsu/tkbs_en/TKBS_EN_GM101_Top.action].*

International Search Report (PCT/ISA/210) issued on Feb. 21, 2011, by the European Patent Office as the International Searching Authority for International Application No. PCT/EP2010/070037.

French Search Report for Application No. FR 0959339 issued on Jul. 6, 2010.

* cited by examiner

TYRE TREAD HAVING CAVITIES AND INCISIONS

FIELD OF THE INVENTION

The invention relates to a tyre tread and more particularly a tread comprising a plurality of cavities placed inside the said tread.

PRIOR ART

Document JP2001063323 discloses a tread comprising a plurality of ribs extending mainly in a circumferential direction, each rib having generally a parallelepipedal form. Each rib comprises a contact face designed to be in contact with a roadway and a plurality of lateral faces cutting the said contact face.

A rib placed in the central portion of the tread comprises a cavity extending mainly in the circumferential direction.

The cavity in the rib is moulded with the aid of a moulding element. This moulding element is present in the tread at the time of moulding and vulcanization of the said tread, then removed once the tread is vulcanized. When it is removed, the moulding element leaves in the rib a volumic impression corresponding to the cavity.

However, with the manufacturing processes currently used, the moulding element also forms an additional incision in the tread. This additional incision extends in the height of the rib and emerges both in the cavity and at the contact face of the rib. This incision extends mainly in the same direction as the cavity, that is to say in the circumferential direction.

Since the incision emerges on the contact face of the rib, the overall rigidity of the rib reduces. If the rib is subjected to very high pressures, the latter may twist which causes a reduction in the area of contact with the roadway and consequently a loss of grip between the tread and the roadway.

This phenomenon, also called buckling, is all the greater when the rib has the shape of a strip, that is to say when the rib has a high slenderness ratio. In this instance, "high slenderness ratio" means that the rib has a great length and a great height with a narrow width relative to this height and this width.

The object of the invention therefore is to solve the problem of providing at least one rib with one or more internal cavities while limiting the loss of rigidity of this rib in order to prevent any risk of buckling.

DEFINITIONS

"Tyre" means all types of tyres whether or not they are internally pressurized when running.

"Tyre tread" means a quantity of rubber compound delimited by lateral surfaces and by two main surfaces of which one is intended to come into contact with a surface when the tyre runs.

"Tread surface" means the surface formed by the points of the tyre tread that come into contact with the surface when the tyre runs. "Rib" means a raised element delimited by cut-outs.

"Cavity" means a hollow portion delimited by a wall of material.

"Circumferential direction" means a direction tangential to a circle of which the centre is on the rotation axis of a tyre provided with the tread.

"Transverse direction" means a direction parallel to the rotation axis of the said tyre.

SUMMARY OF THE INVENTION

The invention relates to a tyre tread comprising a plurality of ribs delimited by cut-outs, each rib having a length and each rib having a determined width between a first lateral face of the rib and a second lateral face of the rib, the said width being less than the said length. At least one rib out of the plurality of ribs comprises at least one cavity placed inside the said rib, the said cavity extending mainly in the length of the said rib. The tread comprises an incision extending mainly in the length of the said rib, the said incision emerging on the first lateral face of the rib and the said incision emerging in the cavity while forming an opening, the length of the opening determined in the length of the rib corresponding to at least 80% of the length of the cavity determined in the length of the said rib.

The incision and the opening formed by this incision on the wall delimiting the cavity make it easier to remove the moulding element from the rib while limiting the risks of tearing the rubber during this removal. In the invention, the incision does not emerge on the contact face of the rib but on a lateral face of this rib. Therefore, the incision extends in a direction having a non-zero component in a plane parallel to the contact face of the rib. When the rib is subjected to a compression, the walls delimiting the incision come into contact and the incision closes. The rigidity of the rib is then maintained during running of the tread.

In a preferred embodiment, the thickness of material between the cavity and the second lateral face of the rib is greater than or equal to ⅓ of the width of the rib.

The moulding element is installed on a vulcanizing mould. When the press containing the mould opens to allow the removal of the tread thus moulded and vulcanized, the moulding element makes a motion of relative movement in a radial direction relative to the axis of the tyre and therefore relative to the rib. During the mould-stripping operation, the moulding element exerts a high stress on the portion of the rib situated between the cavity and the second lateral face. By maintaining a minimum thickness of rubber material between the cavity and this second lateral face, the moulding element is prevented from tearing some or all of the rib when the said moulding element is removed from the tread.

In a preferred embodiment, the incision forms an angle of between 30° and 60° with a direction perpendicular to the said first lateral face of the rib and, starting from the cavity, the incision extends in a direction having a radial component directed towards the said contact face.

Therefore, the risks of tearing the rubber in the rib when the moulding element is removed are further restricted.

In a variant embodiment, the cavity comprises a portion in the form of a ramp placed in the extension of the slot.

The removal of the moulding element is made easier.

In a variant embodiment, the incision has an undulating profile on the first lateral face.

The incision is delimited by a first surface and a second surface opposite to the first surface. Through this undulating profile, the blocking of relative motions of the first surface of the incision relative to the second surface of the incision in the length of the block is made easier.

Preferably, or in another variant embodiment, the incision has an undulating profile in a plane orthogonal to the first lateral face.

With this undulating profile the blocking of relative motions of the first surface of the incision relative to the second surface of the incision in the width of the rib is made easier.

In a preferred embodiment, all the incisions of the ribs of the plurality of ribs emerge on one and the same side relative to the said ribs.

The invention may therefore be applied to directional tyres comprising a preferred running direction, this preferred running direction usually being indicated on the tyre.

In a variant embodiment, the incisions of the ribs of the plurality of ribs emerge alternately either on a first side relative to the said ribs or on a second side relative to the said ribs.

The invention may therefore be applied to non-directional tyres.

In a preferred embodiment, each rib of the plurality of ribs has a determined height, the said height being greater than or equal to three times the width of the said rib.

In a preferred embodiment, the ribs of the plurality of ribs form strips of which the length is oriented in a transverse direction.

"Strip" means that the rib has a high slenderness ratio.

Another subject of the invention relates to a tyre comprising a tread as described above.

In a preferred embodiment, the tyre is a snow tyre.

"Snow tyre" or "winter tyre" means a tyre marked with an inscription M+S or M.S. or else M&S, marked on at least one of the tyre sidewalls. This snow tyre is characterized by a tread design and a structure designed above all to provide, in mud and fresh or melting snow, a better behaviour than that of a tyre of the road type designed to run on snow-free surfaces.

Other features and advantages of the invention will emerge from the following description given as an example, and not limiting, with respect to the appended drawings in which.

Figure 1:
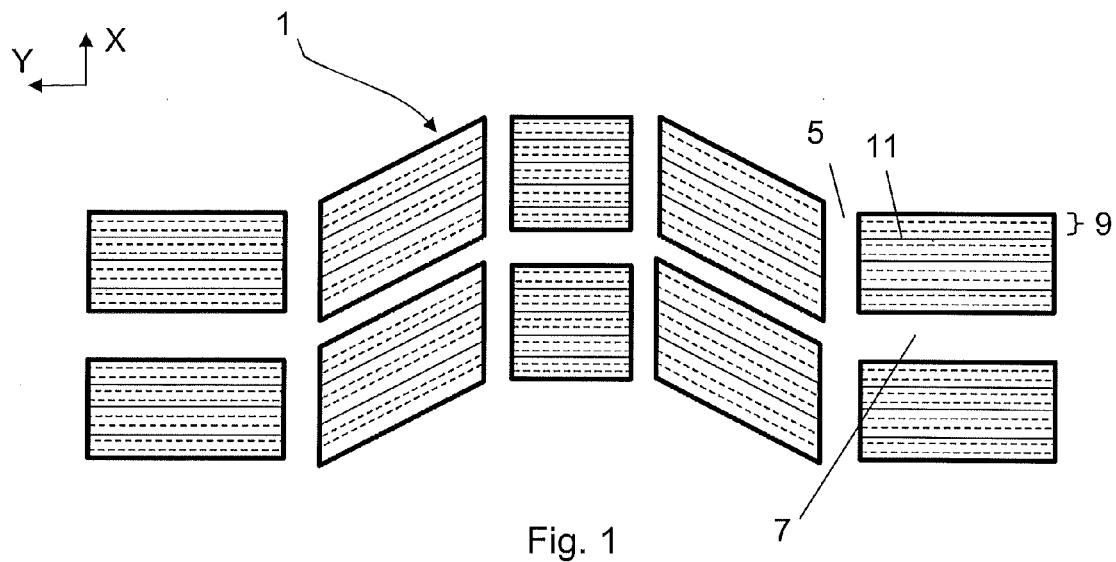
FIG. 1 represents a partial view of the tread surface of a tread according to the invention, the said tread comprising a plurality of strips.
Figure 2:
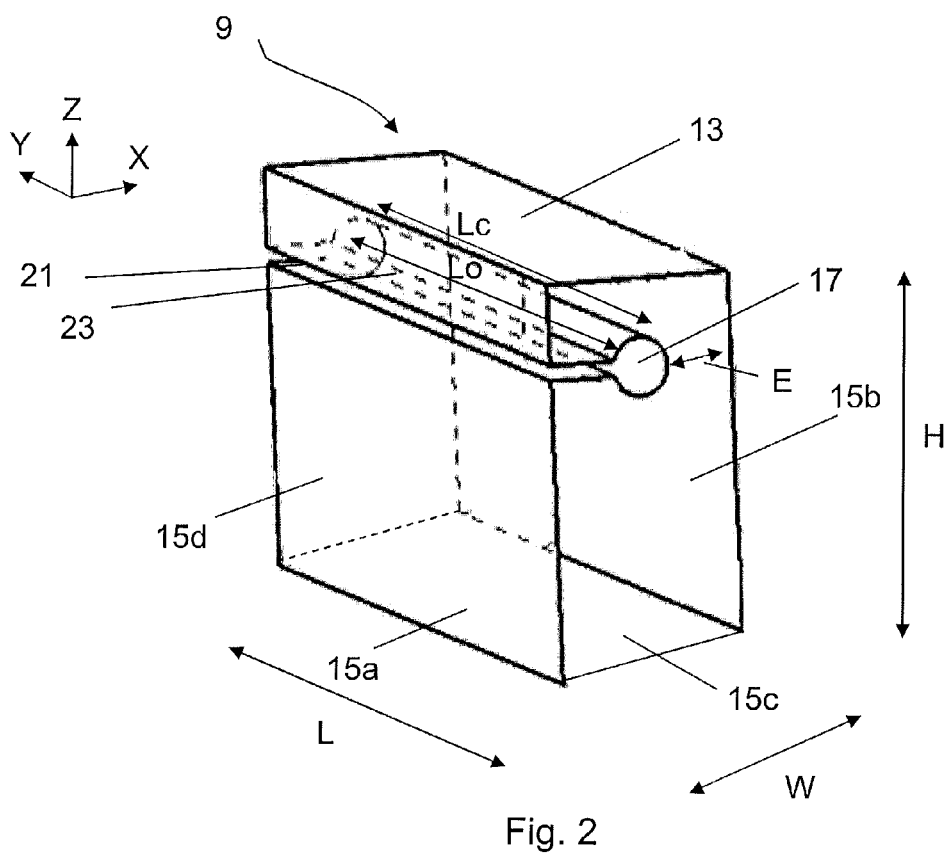
FIG. 2 represents schematically a view in perspective of a strip of the tread of FIG. 1 according to a first embodiment of the invention.
Figure 4:
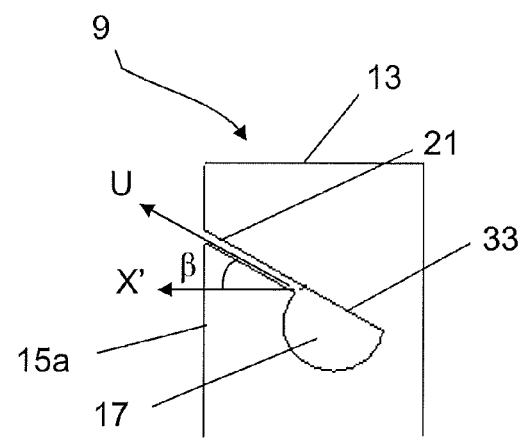
Figure 5:
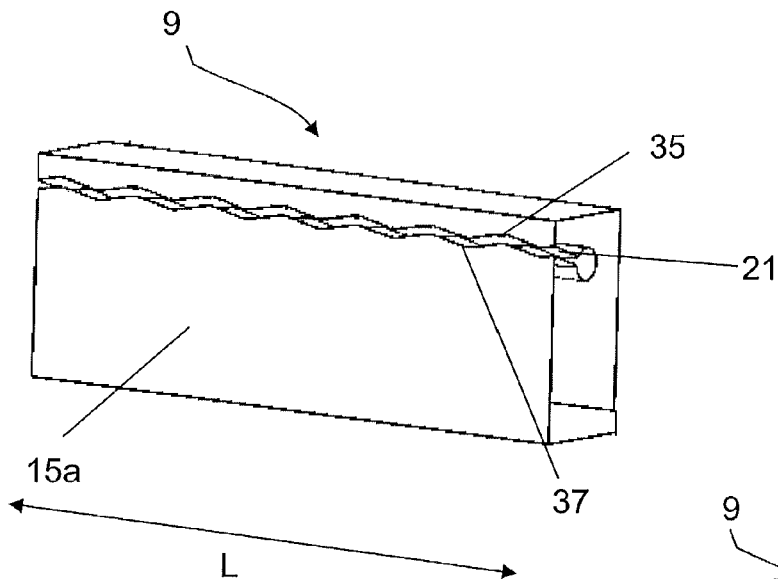
Figure 6:
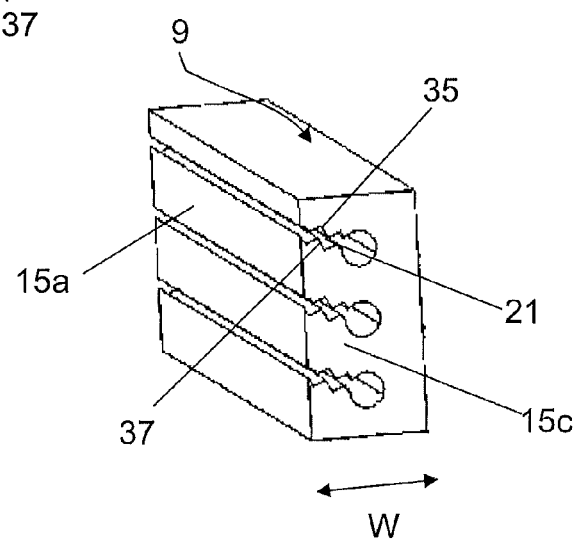
Figure 7:
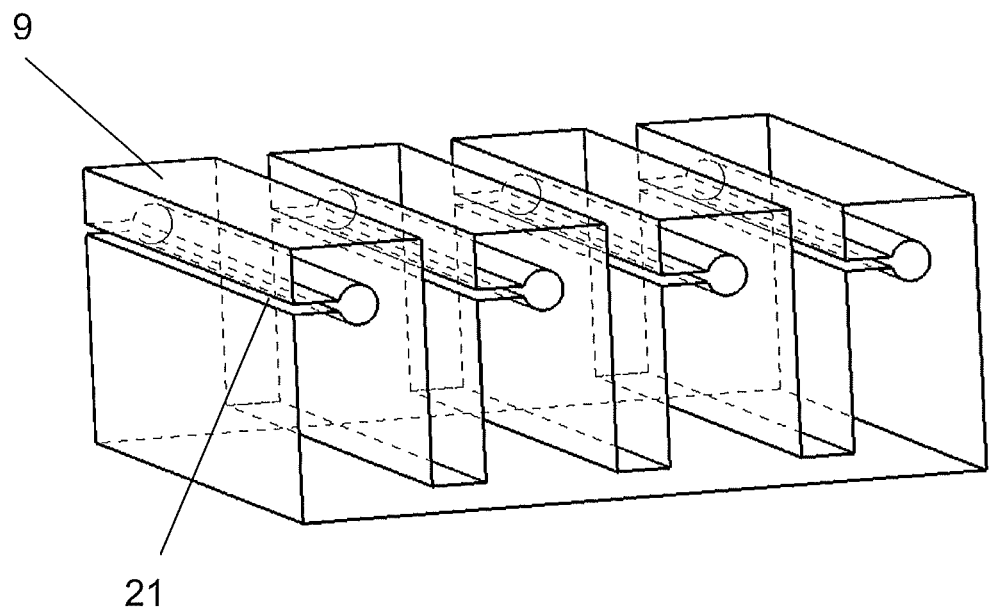
Figure 8:
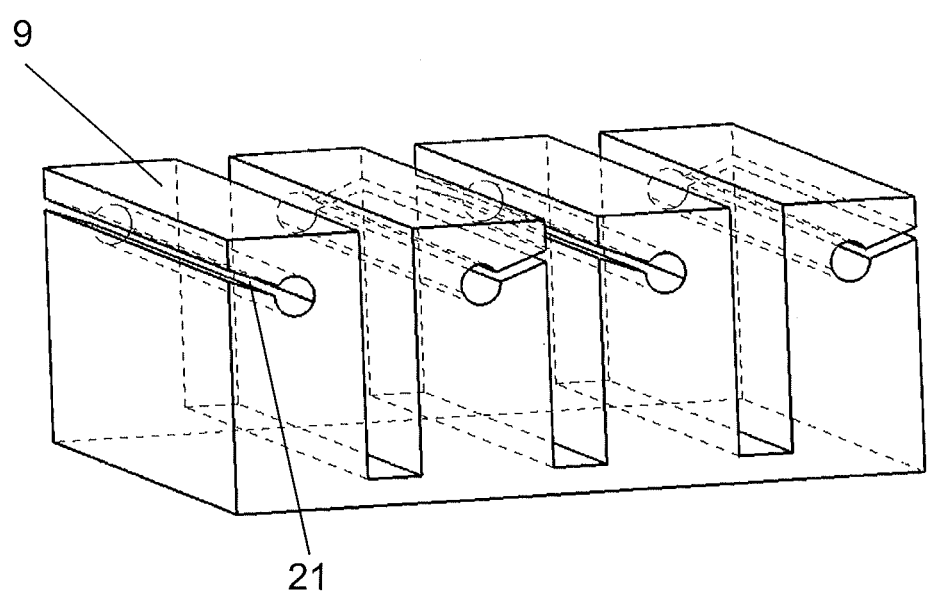

FIGS. 3*a*, 3*b*, 3*c*, 3*d* represent various steps of a method for mould-stripping a moulding element used for the moulding of a cavity in the strip of FIG. 2;

FIG. 4 represents schematically a view in section of a strip of the tread of FIG. 1 according to a second embodiment of the invention;

FIG. 5 represents schematically a view in perspective of a strip of the tread of FIG. 1 according to a third embodiment of the invention;

FIG. 6 represents schematically a view in perspective of a strip of the tread of FIG. 1 according to a fourth embodiment of the invention;

FIG. 7 represents schematically a view in perspective of a plurality of strips arranged in a first arrangement mode;

FIG. 8 represents schematically a view in perspective of a plurality of strips arranged in a second arrangement mode.

The invention is described here for ribs having a generally parallelepipedal shape having a high slenderness ratio, that is to say that the ribs have a great length and a great height for a narrow width relative to this height and this width. These particular ribs are called strips in the rest of the description. However, it will be noted straight away that the invention is not limited to the strips but may extend to ribs having an entirely different ratio between their length, their height and their width.

In the following description, elements that are substantially identical or similar will be indicated by identical references.

FIG. 1 represents a partial view of a tread surface of a tread 1 comprising a plurality of strips 9 delimited by cut-outs 5, 7, 11. The cut-outs 5, 7, 11 emerge on the tread surface.

FIG. 2 represents schematically a view in perspective of a strip 9 of FIG. 1 according to a first embodiment of the invention.

The strip 9 comprises a contact face 13 designed to be in contact with a roadway.

The strip 9 also comprises a first lateral face 15*a*, a second lateral face 15*b*, a third lateral face 15*c* and a fourth lateral face 15*d*. The first lateral face 15*a* in this instance extends in a transverse direction Y. The second lateral face 15*b* extends parallel to the first lateral face 15*a*. The third lateral face 15*c* extends in a circumferential direction X, perpendicularly to the first lateral face 15*a*. The fourth lateral face 15*d* extends parallel to the third lateral face 15*c*. Each of the lateral faces 15*a*, 15*b*, 15*c*, 15*d* cuts the contact face 13.

The strip has a width W between the first lateral face 15*a* and the second lateral face 15*b*. The strip also has a length L between the third lateral face 15*c* and the fourth lateral face 15*d* and the length L of the strip is greater than the width W of the strip. The strip 9 also has a height H determined between the contact face 13 and the bottom of the cut-outs delimiting the strip. The height H is for example equal to three times the width W of the strip 9.

The strip 9 comprises a cavity 17 in this instance having a generally cylindrical shape. In a variant embodiment, the cavity 17 has a non-cylindrical shape, such as a parallelepipedal shape.

The cavity 17 is placed inside the strip 9 under the contact face 13. Therefore, in the new state of the tread, the cavity 17 does not emerge on the contact face 13 of the strip 9.

In the example of FIG. 2, the cavity 17 extends mainly in the length L of the strip 9 and the cavity 17 emerges on the third lateral face 15*c* and the fourth lateral face 15*d* and the length Lc of the cavity corresponds to the length L of the strip. As a variant, the cavity 15 does not emerge on these lateral faces 15*c*, 15*d*. In another variant, the cavity emerges on only one of these lateral faces 15*c*, 15*d*.

The strip 9 also comprises an incision 21. The incision 21 extends mainly in the length L of the strip 9. The incision 21 emerges on the first lateral face 15*a* of the rib and in the cavity 17. By emerging in the cavity, the incision forms an opening 23 shown partially in dashed line in FIG. 2. The length Lo of the opening corresponds to at least 80% of the length Lc of the cavity 17. In the situation of FIG. 2, the length Lo of the opening, the length Lc of the cavity and the length L of the strip are identical.

It will be noted that the thickness E of material between the cavity 17 and the second lateral face 15*b* is greater than or equal to ⅓ of the width W of the strip 9.

It will also be noted that the width of the incision 21, that is to say the distance separating two walls delimiting the incision, is in this instance less than 1 mm.

FIGS. 3*a*, 3*b*, 3*c*, 3*d* represent the various steps of a method for mould-stripping a moulding element from the strip 9.

The moulding element 41 is installed on a vulcanizing mould 25.

The moulding element 41 comprises a first portion 43 designed to mould the incision 21 in the strip 9. The first portion 43 is secured to the vulcanizing mould 25.

The moulding element also comprises a second portion 45 connected to the first portion 43. The second portion 45 is designed to mould the cavity 17 in the strip 9.

Figure 3A:
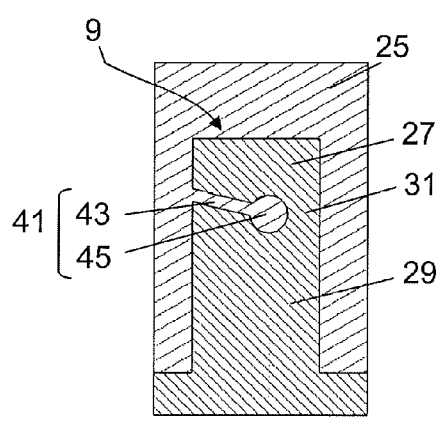

The first step, shown in FIG. 3*a*, shows the position of the moulding element in the strip 9 following the vulcanization of the tread.

In this first step, the moulding element 41 partially separates the strip 9 into an upper portion 27 and a lower portion 29. A connecting portion 31 connects the upper portion 27 to the lower portion 29 of the strip 9.

Figure 3B:
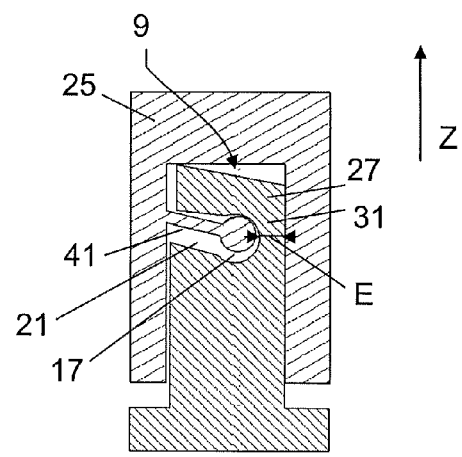

In the second step shown in FIG. 3b, the vulcanizing mould 25 is opened to allow the moulded and vulcanized tread to be removed. The moulding element 23 then makes a motion of relative movement in a radial direction Z relative to the strip 9. In this second step, the moulding element 23 comes away from the cavity 17 and from the slot 21 formed by the said moulding element.

A strong force is exerted on the connecting portion 31 during this second step. In order to prevent the moulding element 23 tearing some or all of this strip 9, it is necessary to adequately dimension the thickness E of the connecting portion 31.

Figure 3C:
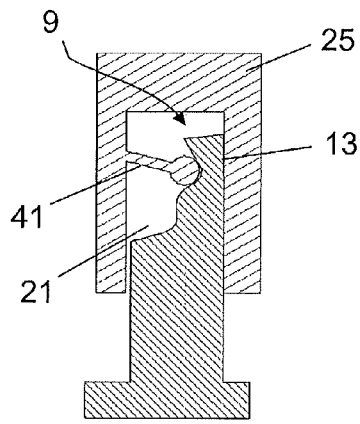

In the third step shown in FIG. 3c, the moulding element 23 is in a position in which it opens the slot 21 wide. In this position, the contact face 13 of the strip 9 is pressed against the inner portion of the vulcanizing mould 25.

Figure 3D:
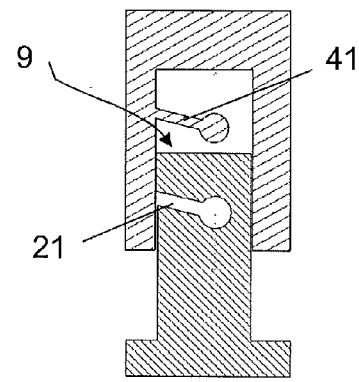

In the fourth step shown in FIG. 3d, the moulding element 23 is out of the slot 21. The strip 9 is then in a position of rest.

FIG. 4 shows schematically a view in section of a strip 9 of FIG. 1 according to a second embodiment.

In this embodiment, the incision 21 forms a non-zero angle β with a direction X' perpendicular to the first lateral face 15a of the strip 9. The incision 21 extends, starting from the cavity 17, in a direction U having a radial component directed towards the contact face 13 of the strip 9.

In a preferred embodiment, the angle β is between 30° and 60°. Preferably, the angle β is 45°. This makes it easier to mould-strip the moulding element while limiting the risk of tearing the rubber when this moulding element is removed.

Preferably, the cavity 17 comprises a portion in the form of a ramp 33 placed in the extension of the incision 21. This portion in the form of a ramp 33 further improves the mould-stripping of the moulding element.

As a variant, the portion in the form of a ramp 33 may be combined with an angle β that is in a range that differs from the range of from 30° to 60°. For example, the angle β is zero.

FIG. 5 represents schematically a view in perspective of the strip 9 of FIG. 1 according to a third embodiment.

In this embodiment, the incision 21 emerges on the first lateral face 15a. The incision 21 has an undulating profile on this first lateral face.

The incision 21 is delimited by a first surface 35 and by a second surface 37. By virtue of the undulating profile of the incision 21 it is possible to block, in the length L of the strip 9, some or all of the relative motions of the first surface 35 relative to the second surface 37 during running of the tread.

FIG. 6 shows schematically a view in perspective of the strip 9 of FIG. 1, according to a fourth embodiment.

In this embodiment, the incision 21 has an undulating profile in a plane orthogonal to the first lateral face 15a, for example in the plane of the third lateral face 15c.

The incision 21 is delimited by a first surface and by a second surface 37. By virtue of this undulating profile, it is possible to block, in the width W of the strip 9, some or all of the relative motions of the first surface 35 relative to the second surface 37.

FIG. 7 shows schematically a view in perspective of a plurality of strips 9 arranged in a first arrangement mode. In this arrangement mode, all the incisions 21 of the strips 9 emerge on one and the same side relative to the said strips 9.

It will be noted in this embodiment the angle β, as defined in FIG. 4, is zero.

FIG. 8 represents schematically a view in perspective of a plurality of strips 9 arranged in a second arrangement mode. In this arrangement mode, the incisions 21 of the strips 9 emerge alternately either on a first side relative to the said strips or on a second side relative to the said strips.

The invention claimed is:

1. A tire tread comprising a plurality of ribs delimited by cut-outs, each rib comprising a plurality of lateral faces cutting a contact face of the rib, each rib having a generally parallelepipedal shape and having a length (L) and a width (W), the width (W) being determined between a first lateral face of the rib and a second lateral face of the rib, the width (W) being less than the length (L),
   wherein at least one rib out of the plurality of ribs comprises at least one cavity delimited by a cavity wall inside the rib, the cavity extending mainly in the length (L) of the rib,
   wherein the tread comprises an incision extending mainly in the length (L) of the rib, the incision delimited by incision walls extending between the first lateral face of the rib and the wall delimiting the cavity, the incision emerging on the first lateral face of the rib and the incision emerging in the cavity thereby forming an opening in the first lateral face of the rib and an opening in the wall of the cavity, the length (Lo) of the opening determined in the length (L) of the rib corresponding at least to 80% of the length (Lc) of the cavity determined in the length (L) of the rib,
   wherein the incision does not emerge on the contact face of the rib, and
   wherein when the rib is subject to compression, the walls of the incision come into contact and the incision closes.

2. The tread according to claim 1, wherein the thickness of material between the cavity and the second lateral face of the rib is greater than or equal to ⅓ of the width of the rib.

3. The tread according to claim 1, wherein the incision forms an angle β of between 30° and 60° with a direction (X') perpendicular to the first lateral face of the rib, and wherein starting from the cavity, the incision extends in a direction (U) having a radial component directed towards the contact face.

4. The tread according to claim 1, wherein the cavity comprises a portion in the form of a ramp placed in the extension of the incision.

5. The tread according to claim 1, wherein the incision has an undulating profile on the first lateral face.

6. The tread according to claim 1, wherein the incision has an undulating profile in a plane orthogonal to the first lateral face.

7. The tread according to claim 1, wherein all the incisions of the ribs of the plurality of ribs emerge on one and the same side relative to the ribs.

8. The tread according to claim 1, wherein the incisions of the ribs of the plurality of ribs emerge alternately either on a first side relative to the ribs or on a second side relative to the ribs.

9. The tread according to claim 1, wherein each rib of the plurality of ribs has a height (H) greater than or equal to three times the width (W) of the rib.

10. The tread according to claim 1, wherein the ribs of the plurality of ribs form strips, some or all of the strips having their length oriented mainly in a transverse direction (Y).

11. A tire comprising a tread according to claim 1.

12. The tire according to claim 11, wherein the tire is a snow tire.

* * * * *